(12) United States Patent
Botwinik et al.

(10) Patent No.: US 8,399,818 B1
(45) Date of Patent: Mar. 19, 2013

(54) LASER DEVICES AND METHODS FOR SIGNATURE ALTERATION OF A TARGET FOR REMOTE TRACKING THEREOF

(75) Inventors: Steven M. Botwinik, Orlando, FL (US); Del Vicker, Howey In The Hills, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 449 days.

(21) Appl. No.: 12/721,093

(22) Filed: Mar. 10, 2010

Related U.S. Application Data

(60) Provisional application No. 61/158,944, filed on Mar. 10, 2009.

(51) Int. Cl.
*G01C 21/02* (2006.01)
(52) U.S. Cl. .................................. 250/203.1; 250/203.6
(58) Field of Classification Search ............... 250/203.6, 250/203.1, 203.2, 214 VT, 214.1; 244/3.11–3.16; 356/4.01, 4.02, 5.01, 3.01; 234/493, 449, 234/450
See application file for complete search history.

(56) References Cited

U.S. PATENT DOCUMENTS

| | | | |
|---|---|---|---|
| 5,273,236 A * | 12/1993 | Wootton et al. | 244/3.11 |
| 6,285,002 B1 * | 9/2001 | Ngoi et al. | 219/121.73 |
| 6,527,193 B1 * | 3/2003 | Beli et al. | 235/493 |
| 7,349,098 B2 * | 3/2008 | Li | 356/479 |

* cited by examiner

*Primary Examiner* — Que T Le
(74) *Attorney, Agent, or Firm* — Withrow & Terranova, PLLC

(57) ABSTRACT

A method of tracking a target comprising causing alteration to the target using a laser, recording an electromagnetic signature of the target after the causing alteration step, and tracking the target using the electromagnetic signature.

21 Claims, 2 Drawing Sheets

LASER DEVICES AND METHODS FOR SIGNATURE ALTERATION OF A TARGET FOR REMOTE TRACKING THEREOF

CROSS-REFERENCE TO RELATED APPLICATIONS

This application claims priority to and the benefit of the filing of U.S. Provisional Patent Application Ser. No. 61/158,944, entitled "Laser Devices and Methods for Signature Alteration of a Target for Remote Tracking Thereof", filed on Mar. 10, 2009, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to methods and apparatuses for allowing a target to be remotely tracked.

2. Description of Related Art

In many cases, it is desirable to change the signature of an object from a distance while having the signature remain the same to the unaided eye. For instance, one may wish to alter the thermal signature of an object without having to come into contact with the object, while also leaving no visible trace of the alteration.

This problem has been solved previously only by using techniques which require either physical contact with the object under observation, or which alter the signature in such a way that it also alters the visible signature to the naked eye. The present invention resolves those deficiencies.

BRIEF SUMMARY OF THE INVENTION

The present invention is of a method of tracking a target, comprising: causing alteration to the target using a laser; recording an electromagnetic signature of the target after the causing alteration step; and tracking the target using the electromagnetic signature. In the preferred embodiment, the laser is an ultra short pulse laser, most preferably a femtosecond laser. The alteration is preferably (but not necessarily) subsurface alteration, more preferably is not visible to the unaided eye, and most preferably such that one or more of emissivity, reflectivity, and absorption of the target is altered in a spectrum not visible to the unaided eye. An airborne system can be employed, and usages include military tracking, surveillance tracking, and commercial tracking.

The invention is additionally of an airborne method of marking a target, comprising: causing alteration to the target using an airborne laser; and recording an electromagnetic signature of the target after the causing alteration step. In the preferred embodiment, the laser is an ultra short pulse laser, most preferably a femtosecond laser. The alteration is preferably (but not necessarily) subsurface alteration, more preferably is not visible to the unaided eye, and most preferably such that one or more of emissivity, reflectivity, and absorption of the target is altered in a spectrum not visible to the unaided eye.

The invention is further of an airborne method of tracking a target, comprising: receiving an electromagnetic signature of the target resulting from alteration caused to the target using a laser; and tracking the target using the electromagnetic signature with an airborne tracking system. In the preferred embodiment, the laser is an ultra short pulse laser, most preferably a femtosecond laser. The alteration is preferably (but not necessarily) subsurface alteration, more preferably is not visible to the unaided eye, and most preferably such that one or more of emissivity, reflectivity, and absorption of the target is altered in a spectrum not visible to the unaided eye.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

In many cases, it is desirable to change the signature of an object from a distance while having the signature remain the same to the unaided eye. For instance, one may wish to alter the thermal signature of an object without having to come into contact with the object, while also leaving no visible trace of the alteration.

Femtosecond (a type of ultra short pulse laser) "etching" can alter subsurface structure without altering the surface or creating any thermal damage or, less preferably, alter surface structure. This technique may be used at a distance, allowing a surface to be "etched" or altered with no visible trace of the alteration on the surface. Furthermore, by changing the subsurface (or surface) structure, the emissivity, reflectivity, and/or absorption of the object will be altered. Therefore, in a specific waveband (such as MWIR), the object appears differently than it did prior to the etching, and this difference is not visible to the unaided eye. A tracking device employing such waveband can then track the marked object.

The solution of the invention offers the user the ability to alter the signature of an object from a standoff distance while not altering the signature to the point that it is visible to the naked eye. One embodiment employs a forward-looking infrared radar system to view the mark made according to the invention. This can then be detected manually by a human viewer and/or automatically by known image-processing techniques and computer software.

Figure 2:
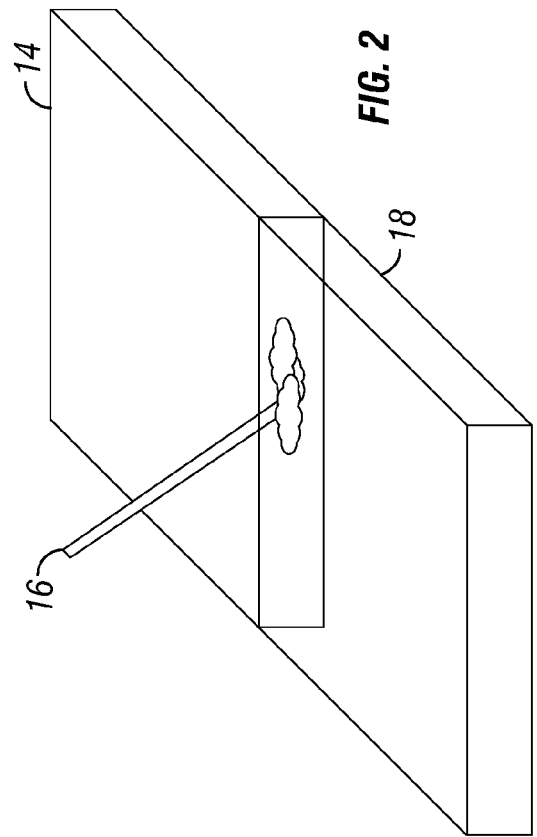
FIG. 2 is a perspective cut-away view of the subsurface of the etched target.
Figure 1:
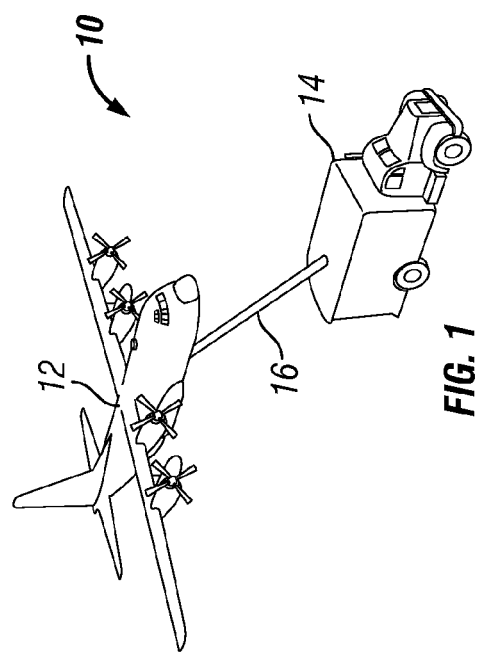
FIG. 1 is a diagram illustrating an apparatus according to the invention etching a remote target according to the method of the invention.
Figure 3:
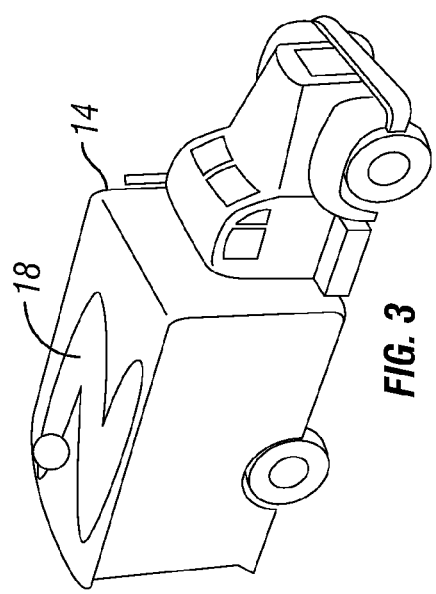
FIG. 3 is a perspective view of the target showing etching not visible to the naked eye.
Figure 4:
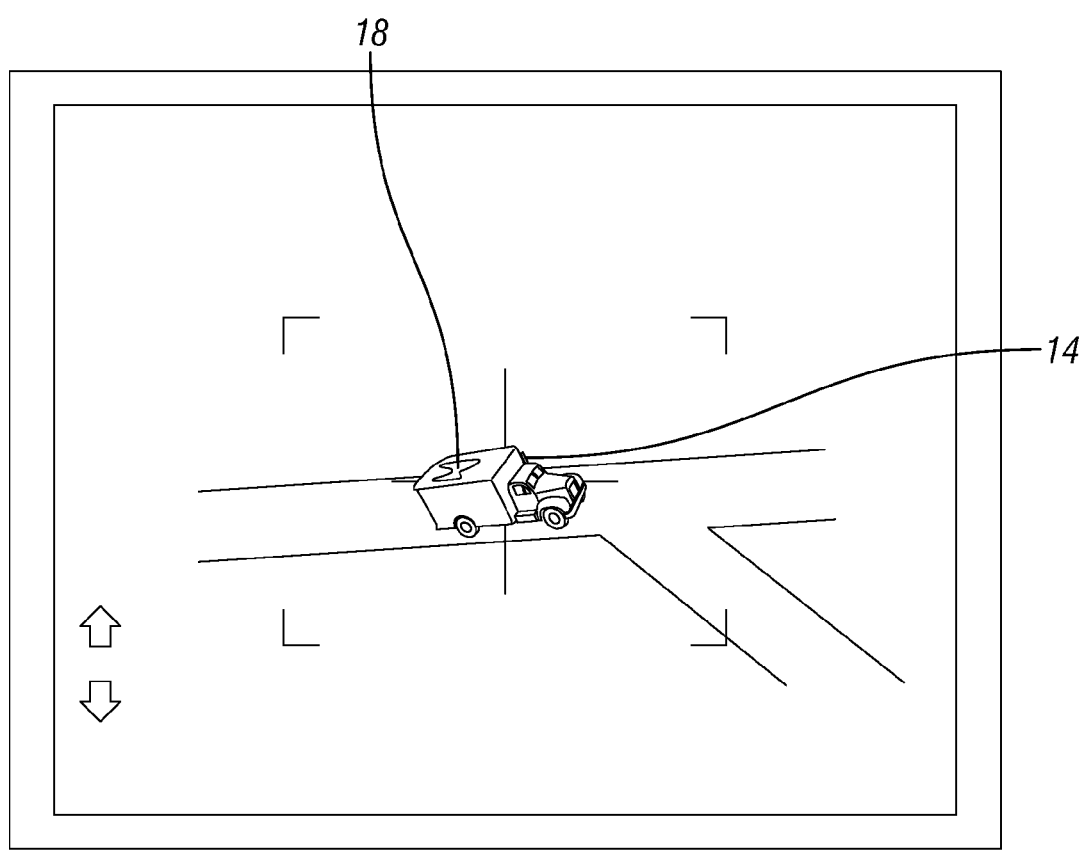
FIG. 4 is a view of the target as seen by a forward-looking infrared radar system (or similar sensor system not relying on the visible light spectrum).

Referring to the figures, FIG. 1 shows the apparatus and method 10 of the invention in action. An apparatus 12 according to the invention (preferably airborne), comprising a laser as above described, etches target 14 via laser beam 16. FIG. 2 shows the resulting subsurface alteration/marking 18 of the target. FIG. 3 shows the target as marked. FIG. 4 then illustrates viewing of the alteration by an apparatus according to the invention comprising a forward-looking infrared radar (or similar non-visual spectrum) system. Such system can be housed in the same apparatus 12 doing the marking or be in a separate (preferably airborne) system.

While the preferred embodiment of the invention is directed to surveillance applications, the invention is also useful in marking of targets for commercial tracking purposes.

In the preferred embodiment, and as readily understood by one of ordinary skill in the art, an apparatus according to the invention will preferably be computer-controlled and include a general or specific purpose computer or distributed system programmed with computer software implementing the steps described above, which computer software may be in any appropriate computer language, including C++, FORTRAN, BASIC, Java, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of tracking a target, the method comprising the steps of:
   causing alteration to the target using a laser;
   directing a beam of electromagnetic radiation having a frequency in an infrared light spectrum at the alteration;
   receiving an electromagnetic signature in response to the beam of electromagnetic radiation striking the alteration; and
   tracking the target using the electromagnetic signature.

2. The method of claim 1 wherein the laser is an ultra short pulse laser.

3. The method of claim 2 wherein the laser is a femtosecond laser.

4. The method of claim 1 wherein the causing alteration step comprises causing subsurface alteration.

5. The method of claim 4 wherein the subsurface alteration is not visible to the unaided eye.

6. The method of claim 5 wherein one or more of emissivity, reflectivity, and absorption of the target is altered in a spectrum not visible to the unaided eye.

7. The method of claim 1 wherein each of the steps is performed by an airborne system.

8. An airborne method of marking a target, the method comprising the steps of:
   causing alteration to the target using an airborne laser; and
   recording an electromagnetic signature of the target after the causing alteration step.

9. The method of claim 8 wherein the laser is an ultra short pulse laser.

10. The method of claim 9 wherein the laser is a femtosecond laser.

11. The method of claim 8 wherein the causing alteration step comprises causing subsurface alteration.

12. The method of claim 11 wherein the subsurface alteration is not visible to the unaided eye.

13. The method of claim 12 wherein one or more of emissivity, reflectivity, and absorption of the target is altered in a spectrum not visible to the unaided eye.

14. An airborne method of tracking a target, the method comprising the steps of:
   directing, from an aircraft in flight, a beam of electromagnetic radiation having a frequency in an infrared light spectrum at an alteration formed in the target via a laser beam;
   receiving, at the aircraft, an electromagnetic signature of the target resulting from the beam of electromagnetic radiation striking the alteration; and
   tracking, from the aircraft, the target using the electromagnetic signature.

15. The method of claim 14 wherein the laser is an ultra short pulse laser.

16. The method of claim 15 wherein the laser is a femtosecond laser.

17. The method of claim 14 wherein the alteration comprises a subsurface alteration.

18. The method of claim 17 wherein the subsurface alteration is not visible to the unaided eye.

19. The method of claim 18 wherein one or more of emissivity, reflectivity, and absorption of the target was altered in a spectrum not visible to the unaided eye.

20. The method of claim 1 wherein the method is employed for a purpose selected from the group consisting of military tracking, surveillance tracking, and commercial tracking.

21. The method of claim 1, wherein directing the beam of electromagnetic radiation and receiving the electromagnetic signature is performed via a forward-looking infrared radar (FLIR) system.

* * * * *